United States Patent Office 3,714,257
Patented Jan. 30, 1973

3,714,257
METHOD FOR PRODUCING DIALKYLATED DIARYLAMINES
Charles Edward Bayha, Monroe, N.Y., and Thomas Raymond Madden, Ringwood, N.J., assignors to Reichhold Chemicals, Inc., White Plains, N.Y.
Filed Jan. 21, 1970, Ser. No. 4,521
Int. Cl. C07c 87/54
U.S. Cl. 260—576                      5 Claims

ABSTRACT OF THE DISCLOSURE

A method of producing a solid dialkylated diarylamine suitable for use as an antioxidant for rubbery materials and other systems subject to degradation, comprising reacting (A) an olefin and (B) a diarylamine in the presence of a Friedel-Crafts catalyst under an inert high pressure atmosphere at a temperature of about 150° C. This method affords a high yield and reduces undesirable by-products.

---

Figure 1:
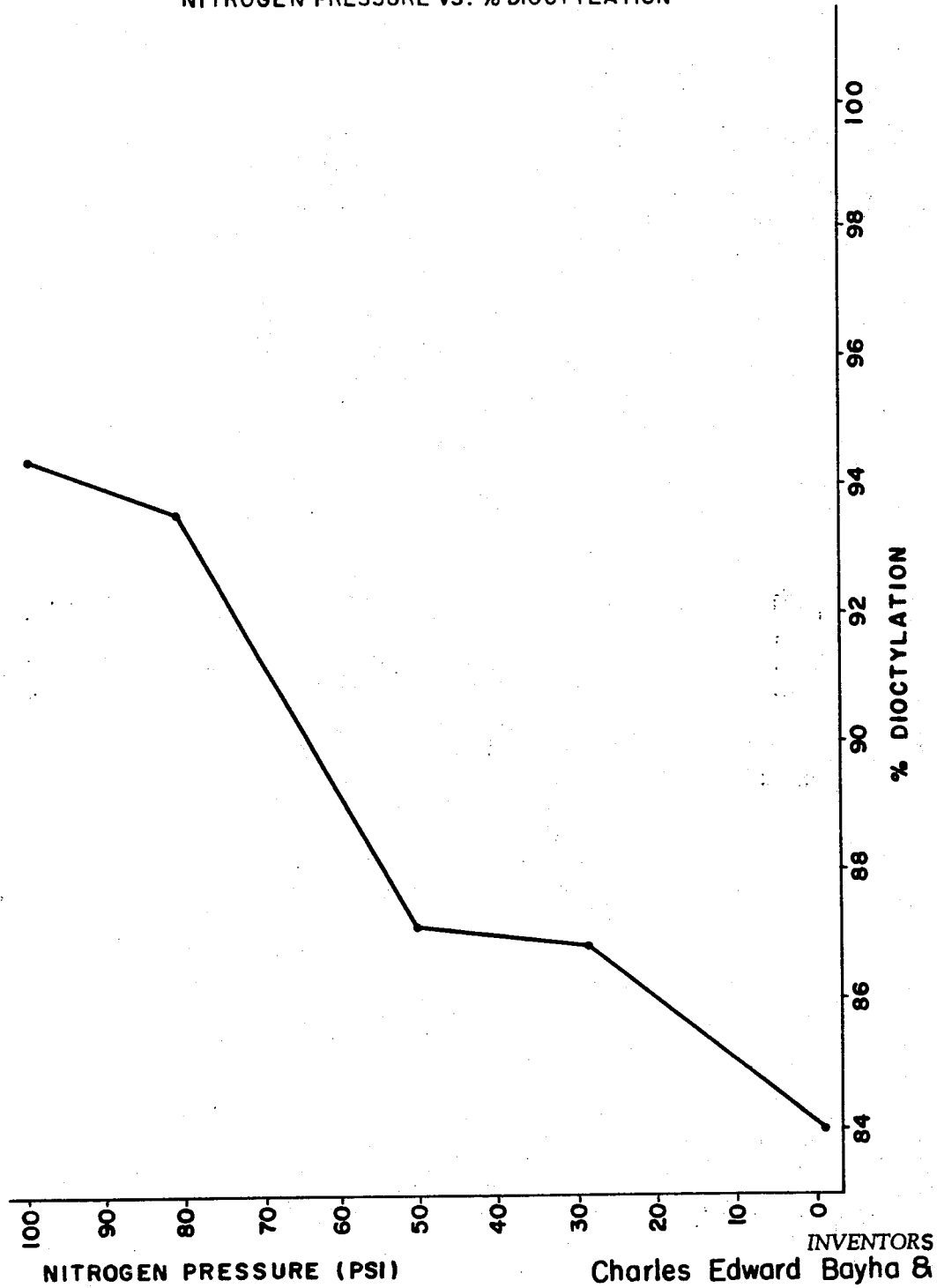

The invention relates to a method of producing dialkylated diarylamines, in particular solid p,p′-dioctylated diphenylamine, in such a manner as to greatly increase the yield of the desired product and eliminate costly processing.

Dialkylated diarylamines have been widely used for many years as antioxidants for rubber compounding and other systems subject to degradation. However, when the alkyl side chain is short, for instance isopropyl, propyl or butyl, or when the diarylamine is diphenylamine, a problem arises. These short side chain diarylamines have a tendency to stain or bloom and are therefore not useful in light colored products. For these applications the higher alkylated, longer side chain, diarylamines, $C_5$ to $C_{10}$ are preferred.

Low staining dialkylated diarylamines may be prepared from $C_5$ to $C_{10}$ alcohols, halides and olefins. The olefins are preferred for several reasons, among which are low cost, ready availability and the fact that no water is produced as a by-product of the reaction. If water is a by-product it should be removed at once or it will deactivate the catalyst. The removal of the water is extremely difficult in this type of reaction. A method of preparation, widely known to the art, is by reacting an excess of olefin with diarylamine in the presence of an acid catalyst at elevated temperatures in a closed vessel. At the completion of the reaction the crude reaction mixture will contain, along with the desired product, dialkylated diarylamine, a considerable quantity of very undesirable olefin polymer, some mono-alkylated diarylamine, some alkylating olefin and unreacted diarylamine. The result of having olefin polymer and unreacted diarylamine in the mixture is a product which is a sticky, odorous liquid and which will not solidify.

Several methods have been employed in the art to remove these undesirable by-products or to reduce them to such a level as would allow for the solidification of the dialkylated diarylamine. Among these have been high temperature, high vacuum distillation of the crude reaction product, the addition of a scavenging agent to reduce undesirable products (U.S. Pat. No. 2,943,112 to Popoff), a cumbersome method which finishes by cooling the dialkylated material in several steps to obtain the desired solid product (U.S. Pat. No. 2,776,994 to Wolfe), and recrystallizing from large quantities of methanol or alkylating olefin. The last method removes, along with the undesirable by-products, from 30% to 40% of the dialkylated compound which cannot be practically reclaimed from the solvent. Even when the solvent is removed a liquid remains which will not solidify.

It is therefore an object of this invention to produce a dialkylated diarylamine antioxidant which is free from the forementioned objectionable characteristics.

It is also an object of this invention to produce a dialkylated diarylamine antioxidant which is a hard and friable solid.

It is a still further object of this invention to produce said solid antioxidant in such a manner as to make it ready for use after neutralization and removal of the catalyst and excess olefin, without further purification.

It has now been found that all the aforementioned objects can be obtained by simply running the reaction under an inert gas atmosphere under pressure with substantial exclusion of oxygen or other reaction gases.

The use of an inert gas atmosphere under pressure gives unexpected results. By adding an inert atmosphere the yield of dialkylated product is greatly increased and the undesirable side products are reduced. Also, a lower temperature of reaction is feasible and this in turn holds polymer formation to a minimum.

Inert gases suitable for purposes of this invention include nitrogen, carbon dioxide and helium at a pressure ranging from about 50 p.s.i. to about 200 p.s.i. Nitrogen, at a pressure of about 100 p.s.i. has been found to be most suitable both from an economic standpoint and because the final product is especially light in color.

A preferred practice of making dialkylated diarylamines in the light of the foregoing objects is such that the diarylamine and the catalyst are mixed at a temperature ranging from about 100° C. to about 200° C. under an inert gas atmosphere having a pressure ranging from about 50 p.s.i. to about 200 p.s.i. The alkylating agent is then introduced and after its addition the reaction is held at the given temperature for about 3 hours. The reaction mixture is then neutralized, filtered and excess olefin and any polymer which has been formed are removed. Upon cooling, the solid dialkylated diarylamine is suitable for use with no further purification steps necessary.

These objects and advantages as well as others will become more apparent to those skilled in the art from the following detailed description and examples.

As the alkylating agent there may be used $C_5$ to $C_{10}$ alkenes such as pentene-1, hexene-1, octene-1, heptene-1, nonene-1, decene-1, diisobutylene and their isomers, etc. and mixtures thereof. In the preferred practice of this invention diisobutylene is used because outstanding results are achieved therefrom. Commercial diisobutylene is predominantly a mixture of two isomers, 2,4,4 - trimethyl pentene-2 and 2,4,4-trimethyl pentene-1. Henceforth the word diisobutylene, when used throughout this invention, will include the mixture of these isomers.

The diarylamines suitable for use in this invention to form solid antioxidants have the general formula:

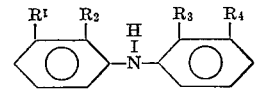

wherein $R_1$, $R_2$, $R_3$ and $R_4$ are at least one member selected from the group consisting of hydrogen, naphthyl, halogen, and alkyl having from 1 to 4 carbon atoms, exemplified by o,o′-dimethyl diphenylamine, o,o′-m,m′-tetra methyl diphenylamine, o,o′-diethyl diphenylamine, o-chlorodiphenylamine, o,o′-dichloro diphenylamine etc. and mixtures thereof. In the preferred practice of this invention diphenylamine is used for economic reasons and particularly on account of optimum results obtained therefrom.

The Friedel-Crafts catalyst is at least one member selected from the group consisting of aluminum chloride, boron trifluoride, boron trifluoride etherate, zinc chloride, phosphorous acid, phosphorus penta fluoride, stannic chloride, alkyl stannic chloride, vanadium chloride, and the like and mixtures thereof. In the preferred practice of this invention aluminum chloride is used because of economy and superior performance.

The catalyst level may vary with the catalyst used from about 0.01 mole to about 1 mole per mole of diarylamine. With aluminum chloride as the catalyst a ratio of about 0.3 mole per mole of diphenylamine produces superior results.

In a typical example of this invention a clean dry autoclave is flushed with dry nitrogen gas. Diphenylamine is added with stirring and the temperature is raised to about 140° C., at which point the aluminum chloride is added and the autoclave is sealed. Dry nitrogen gas is added until the pressure is 100 p.s.i. The temperature is then raised to about 150° C. and the dry diisobutylene is slowly added over a period of about 1 hour. These conditions are maintained for three additional hours. The temperature is then lowered to about 75° C. and the crude reaction mixture is removed. The aluminum chloride is then neutralized, filtered off and the excess diisobutylene and any polymer are removed. The p,p'-dioctyl diphenylamine is then allowed to cool and solidify and is ready for use with no further purification steps required. The solid has a p,p'-dioctyl diphenylamine content above 85%, a mono-octylated diphenyl amine content of from about 4% to 9% and a free diphenylamine content of about 0.3%. Yield is about 99% based on the weight of diphenylamine used and has a melting point of at least 75° C.

For optimum results it has been found that a ratio of about three to four moles of diisobutylene per mole of diphenylamine is desirable. If a larger excess of diisobutylene is used polymer formation is greatly increased as well as other substituted diphenylamine products.

Following are some examples offered as being typical and illustrative of this invention but by no means limiting it in its scope.

EXAMPLE I

To a clean and dry autoclave, three moles of diphenylamine were charged. After being heated to 140° C., 0.3 mole of aluminum chloride was added. After the temperature rise, the autoclave was kept at 150–155° C. One hundred pounds pressure of nitrogen was applied. Then twelve moles of diisobutylene were added taking a period of about 60–90 minutes for addition. After an initial exotherm the autoclave was adjusted to about 150–155° C. When the addition was completed, agitation was continued an additional 3 hours. After the reaction period was completed the charge was cooled to 60° C. and 100 ml. of $H_2O$ was slowly added. Magnesol (an acid silicate of magnesium manufactured by Waverly Chemical Co., Inc., Mamaroneck, N.Y. This product is defined in Reinhold's, The Condensed Chemical Dictionary, 6th edition, on page 694.) 100 g. was then slowly added to the reaction mixture. After this the mixture was agitated at 80–90° C. for one hour. The mixture was then filtered and was stripped of excess diisobutylene. Analysis of the mixture by GLC (Gas-Liquid Chromatograph, F & M Scientific Corp. Model 810) showed that less than 0.4% diphenylamine was present. The pot temperature was then raised to 170° C. and a vacuum of 20–30 mm. applied. A viscous liquid distilled out between 70–150° C. Cooling the reaction mixture below 50° C. resulted in crystallization. The solid melted at 75–85° C. Analysis by GLC showed that 85.0% was the di-product, 9.0% the monoproduct, and 0.3% free diphenylamine. The yield was 1440 g.

EXAMPLE II

Example II was run exactly as in #1 except that the reaction mixture was allowed to crystallize in the reactant solvent after the acid had been removed. Thus, cooling the well-agitated solution produced a semi-solid mass. After complete crystallization, the whole was press filtered. The solid product had a melting point of 85–90° C. The liquid residue was then stripped of diisobutylene. Analysis of the solid by GLC indicated that 93% was the di-product, 4.3% the mono-product, and 0.2% free diphenylamine. Analysis of the liquid by GLC indicated that 54% was the di-, 37% was the mono-, and 0.8% free diphenylamine. Yield of the solid was 1190 g. and of the liquid 380 g.

EXAMPLE III

The procedure of Example I was followed exactly except that diisobutylene was replaced by heptene-1.

EXAMPLE IV

The procedure of Example I was followed exactly except that diisobutylene was replaced by nonene-1.

EXAMPLE V

To demonstrate that this reaction is indeed influenced by pressure the following experiment was conducted. Pure p,p'-dioctyl diphenylamine was heated with aluminum chloride at 150° C. to 155° C. under a vacuum of 30 mm. After 12 hours diisobutylene was distilled from the reaction mixture. The residue contained, by GLC analysis, 85% diphenylamine, 10% mono-octyl diphenylamine, and 5% starting material. Thus the pure dioctylated diphenylamine under reduced pressure and in the presence of a catalyst dealkylates back to the original starting materials.

Figure 2:
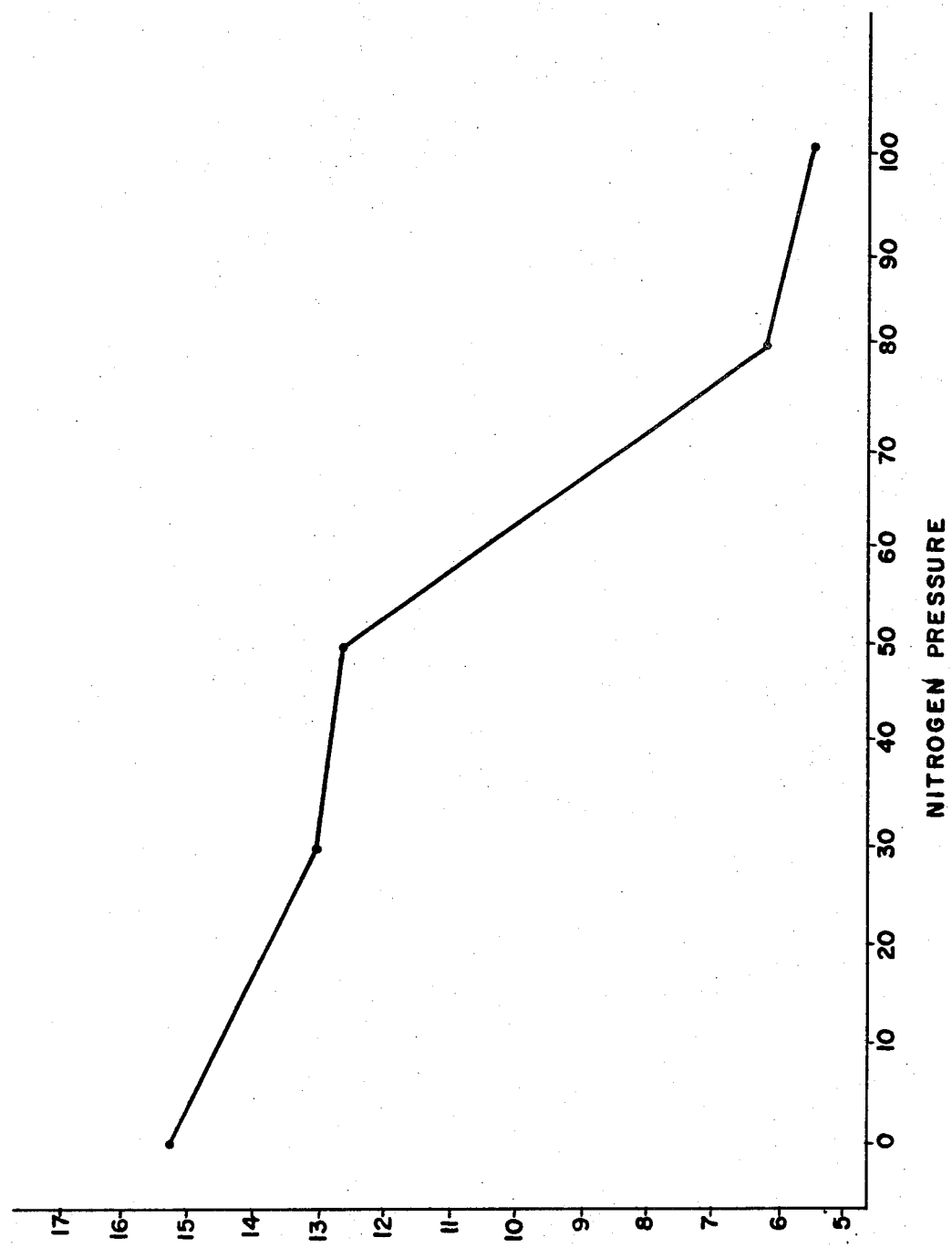
Figure 3:
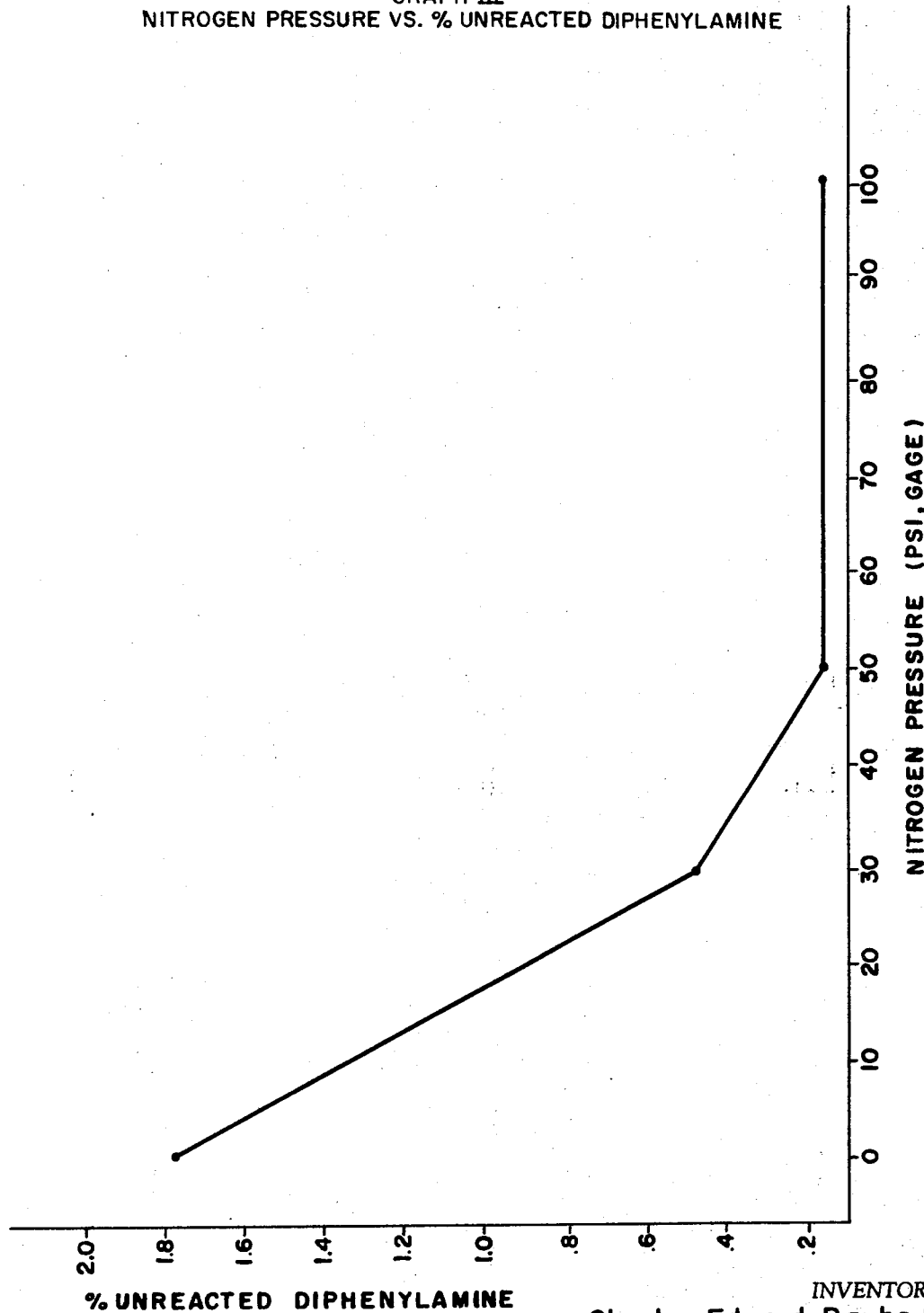

Data for the following tables and the accompanying graphs (FIGS. 1, 2 and 3) were taken from the foregoing examples.

The following table, Table A, shows how the amount of di-octylated product increases as the nitrogen pressure is increased. Conversely, the amounts of mono-octylated product and diphenylamine decrease markedly.

TABLE A

Nitrogen pressure versus percent di-octylation versus percent mono-octylation plus percent unreacted diphenylamine

| | | Percent | |
|---|---|---|---|
| | $N_2$ | Di | Mono +DPA |
| 1 | 0 | 84.1 | 15.5 |
| 2 | 30 | 86.8 | 13.2 |
| 3 | 50 | 87.2 | 12.8 |
| 4 | 80 | 93.7 | 6.3 |
| 5 | 100 | 94.4 | 5.6 |

Table B shows the relationship between nitrogen pressure and the amount of free diphenylamine which remains in the final product. The method of analysis used for the detection of free diphenylamine does not allow for accurate detection of percentages below 0.2%. detection of percentages below 0.2%.

TABLE B

Nitrogen pressure versus percent diphenylamine

| | $N_2$ | Percent DPA |
|---|---|---|
| 1 | 0 | 1.8 |
| 2 | 30 | 0.5 |
| 3 | 50 | 0.2 |
| 4 | 80 | 0.2 |
| 5 | 100 | 0.2 |

The accompanying drawings serve to graphically illustrate the effect of an inert gas pressure atmosphere on increasing the dialkylated product and reducing the amount of by products and unreacted diarylamine.

Graph I (FIG. 1) shows that by increasing the nitrogen pressure an increase in the amount of di-octylation is obtained.

Graph II (FIG. 2) demonstrates that with increasing nitrogen pressure the percentage of reaction by products, mono-octylated products and unreacted diphenylamine, drops sharply.

Graph III (FIG. 3) illustrates how the percent of unreacted diphenylamine drops off markedly as the nitrogen pressure is increased.

What is claimed is:

1. In a process for preparing a solid dioctylated diphenylamine consisting essentially of reacting (A) diisobutylene and (B) diphenylamine in the presence of aluminum chloride as a catalyst at an elevated temperature ranging from 100° C. to 200° C. and recovering said dioctylated diphenylamine; the improvement wherein said reaction is carried out under an inert gas atmosphere consisting essentially of nitrogen having a pressure ranging from about 50 p.s.i. to about 200 p.s.i.

2. The process according to claim 1, wherein the catalyst level ranges from about 0.01 to about 1.0 mol.

3. A process according to claim 1, wherein the catalyst level is about 0.3 mol.

4. A process according to claim 1, wherein the inert gas atmosphere pressure is 100 p.s.i.

5. A process according to claim 1, wherein the temperature is about 150° C.

References Cited

UNITED STATES PATENTS

| | | | |
|---|---|---|---|
| 2,776,994 | 1/1957 | Wolfe et al. | 260—576 |
| 2,943,112 | 6/1960 | Popoff et al. | 260—576 |
| 3,496,230 | 2/1970 | Kaplan | 260—576 |

OTHER REFERENCES

Groggins, Unit Processes in Organic Synthesis, McGraw-Hill Book Co. Inc., New York (1958), pp. 823–825.

LEWIS GOTTS, Primary Examiner

C. F. WARREN, Assistant Examiner

U.S. Cl. X.R.

260—45.9 R, 814